US006955363B2

(12) United States Patent
Libretti et al.

(10) Patent No.: US 6,955,363 B2
(45) Date of Patent: Oct. 18, 2005

(54) TOY SHOPPING CART

(75) Inventors: Elizabeth A. Libretti, Santa Monica, CA (US); Frederick Loh Man Wai, Hong Kong (CN); Jon Marine, Fullerton, CA (US)

(73) Assignee: Mattel, Inc., El Segundo, CA (US)

( * ) Notice: Subject to any disclaimer, the term of this patent is extended or adjusted under 35 U.S.C. 154(b) by 47 days.

(21) Appl. No.: 10/727,278

(22) Filed: Dec. 3, 2003

(65) Prior Publication Data

US 2005/0121863 A1 Jun. 9, 2005

(51) Int. Cl.$^7$ ............................................. A63H 17/00
(52) U.S. Cl. ........................ 280/33.993; 280/33.991; 280/47.35; 280/47.38; 446/471
(58) Field of Search ...................... 280/33.991, 33.992, 280/33.993, 33.997, 47.19, 47.35, 47.38, 280/79.3; 297/250, 256.17; 446/6, 71, 75, 446/76, 77, 471, 412, 451

(56) References Cited

U.S. PATENT DOCUMENTS

| | | | |
|---|---|---|---|
| 2,210,292 A * | 8/1940 | Hodgkin ...................... 280/204 |
| 2,443,236 A * | 6/1948 | Gallagher ................. 280/47.35 |
| 2,615,726 A * | 10/1952 | Brottman ................. 280/47.35 |
| 3,575,250 A * | 4/1971 | Dykes .......................... 180/11 |
| 4,763,919 A | 8/1988 | Nakao et al. |
| 4,834,404 A * | 5/1989 | Wood ..................... 280/33.993 |
| 4,953,887 A | 9/1990 | Takahashi et al. |
| D315,379 S | 3/1991 | Kolker |
| 5,011,169 A * | 4/1991 | Henderson et al. .......... 280/202 |
| D330,964 S * | 11/1992 | Hampshire ................... D3/309 |
| 5,203,578 A * | 4/1993 | Davidson et al. ...... 280/33.991 |
| D344,701 S | 3/1994 | Church |
| D359,316 S | 6/1995 | Huang |
| 5,435,582 A * | 7/1995 | Davidson ................ 280/33.992 |
| 5,553,877 A | 9/1996 | Huang |
| D379,834 S | 6/1997 | Huang |
| 5,848,797 A * | 12/1998 | Paez ...................... 280/33.993 |
| 5,876,046 A | 3/1999 | Courtney et al. |
| D411,264 S | 6/1999 | Huang |
| 5,918,891 A * | 7/1999 | Russell ................... 280/33.991 |
| 6,007,400 A | 12/1999 | Lan |
| 6,022,031 A * | 2/2000 | Reiland et al. ......... 280/33.993 |
| 6,237,924 B1 * | 5/2001 | Reiland et al. ......... 280/33.993 |
| 6,286,844 B1 | 9/2001 | Cone, II et al. |
| 6,364,326 B1 * | 4/2002 | Reiland et al. ......... 280/33.993 |
| 6,464,238 B2 * | 10/2002 | Reiland et al. ......... 280/33.993 |
| 6,497,423 B1 * | 12/2002 | Perelli et al. ............ 280/47.34 |
| 6,607,200 B1 * | 8/2003 | Bridges .................... 280/47.35 |
| 6,736,415 B1 * | 5/2004 | Lenihan ................... 280/47.19 |
| 2002/0102908 A1 | 8/2002 | Chan |

FOREIGN PATENT DOCUMENTS

| | | |
|---|---|---|
| FR | 002667512 A1 | 4/1992 |
| JP | 02001225753 A | 8/2001 |
| JP | 02002362373 A | 12/2002 |

* cited by examiner

*Primary Examiner*—Christopher P. Ellis
*Assistant Examiner*—Kelly E Campbell
(74) *Attorney, Agent, or Firm*—James G O'Neill; Klein O'Neill & Singh, LLP

(57) ABSTRACT

A toy shopping cart has a basket and seat that may be used for different functions and which are easily removed from and reattached to a frame of the shopping cart. The frame of the toy shopping cart has a pair of leg assemblies with four wheels and a number of cross-members with a holding channel formed on one of the cross-members to removably support the basket by a rim and the seat by a holding member in position at the front and the rear of the frame. The basket includes a housing with a base that is supported by a second of the cross-members when held in the frame.

17 Claims, 2 Drawing Sheets

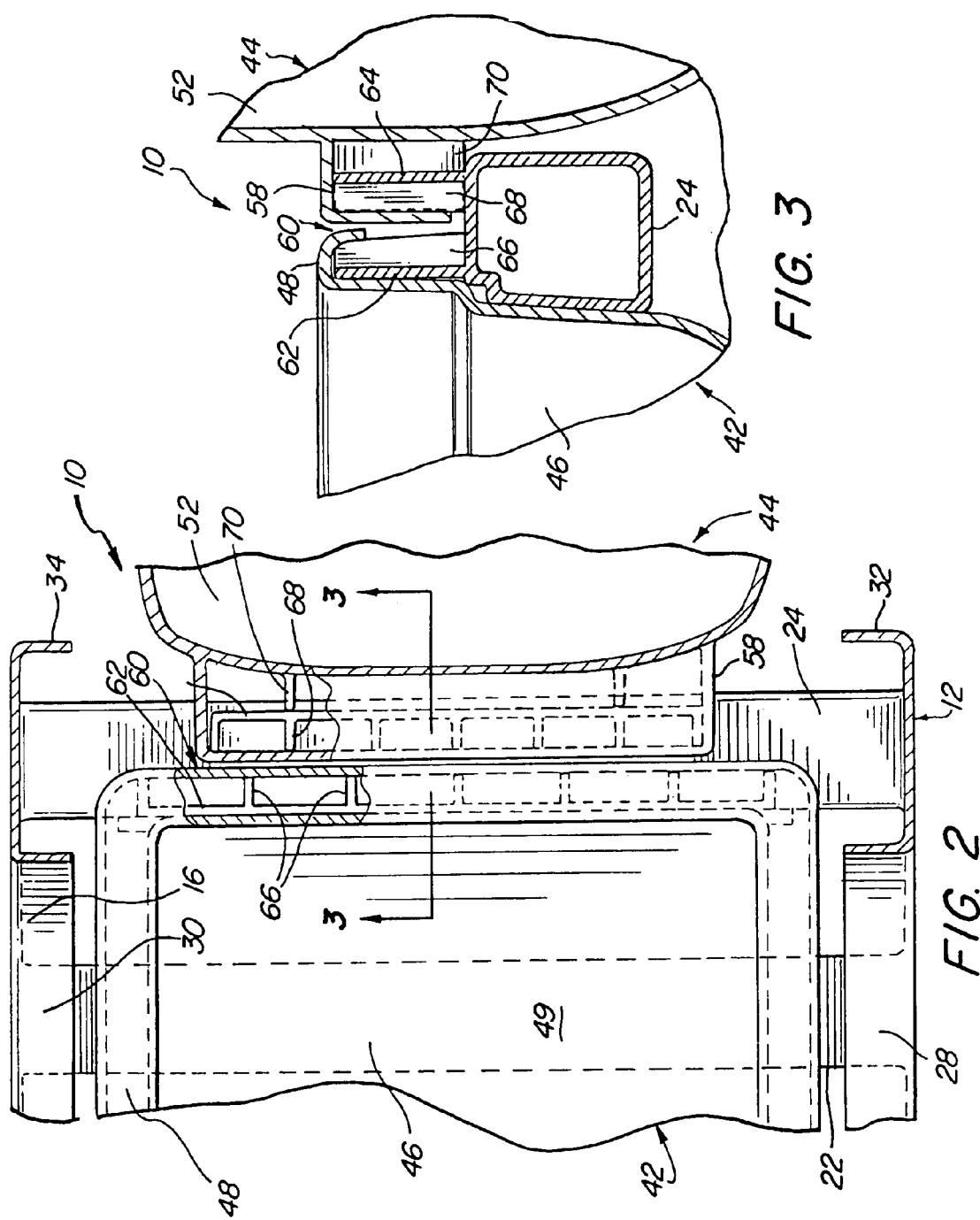

TOY SHOPPING CART

BACKGROUND OF THE INVENTION

1. Field of the Invention

This invention generally relates to toys, and more particularly, to an improved toy shopping cart with a removable basket and a removable seat to enhance the play value of the toy to a child.

2. Description of the Prior Art

There are many known shopping carts and baby carriages and/or strollers that may be used as shopping carts, as well as many known types of toy and non-toy shopping carts and baby carriages/strollers with removable baskets or seats. Examples of such known toys as well as standard size vehicles are shown in U.S. Pat. Nos. 4,763,919 to Nakao et al., 5,553,877 to Huang, 4,953,887 to Takahashi et al., 5,848,797 to Paez, 5,876,046 to Courtney et al., 6,286,844 to Cone II et al., Des. 315,379 to Kolker, Des. 344,701 to Church, Des. 359,316 to Huang, Des. 379,834 to Huang and Des. 411,264 to Huang. However, none of the known prior art discloses or shows, whether taken alone or when properly combined, a toy shopping cart having both a removable doll seat and a removable shopping basket, as disclosed in the present application.

Therefore, there still exists a need in the art for a toy shopping cart that has increased play value and which includes a plurality of removable elements. There also exists a need for a toy shopping cart with removable elements, which allow a child to easily and quickly arrange and use the same during play.

SUMMARY OF THE INVENTION

Accordingly, it is a general object of the present invention to provide an improved toy shopping cart. It is a particular object of the present invention to provide an improved and simplified toy shopping cart having a number of easily removable elements. It is a further particular object of the present invention to provide an improved and simplified toy shopping cart that contains an easily removable and replaceable basket and seat. It is a yet a further particular object of the present invention to provide an improved and simplified toy shopping cart comprising a seat having a feeding tray, which seat may be removed and used as a feeding chair for a doll. It is a still further particular object of the present invention to provide an improved and simplified toy shopping cart comprising a basket and a seat removably held in a channel formed in a frame of the toy shopping cart. And, it is a yet another further particular object of the present invention to provide an improved and simplified toy shopping cart having an easily removable basket and seat held in a frame having a plurality of wheels and a further supporting member for the basket held in the frame.

These and other objects of the present invention are achieved by providing a toy shopping cart that has a plurality of removable elements that may be used for different functions and which are easily removed from and reattached to the shopping cart. The toy shopping cart comprises a main frame with a plurality of wheels and a plurality of cross-members, one of which cross-members includes a channel that removably holds a basket and a seat in position at front and rear portions of the frame.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, wherein:

FIG. 2 is an enlarged partial top plan view of the toy shopping cart of FIG. 1, partially broken away showing the basket and the seat mounted to a channel formed on a cross-member secured in a frame of the shopping cart; and FIG. 3 is a cross-sectional view taken along line 3—3 of FIG. 2.

DESCRIPTION OF THE PREFERRED EMBODIMENTS

Figure 1:
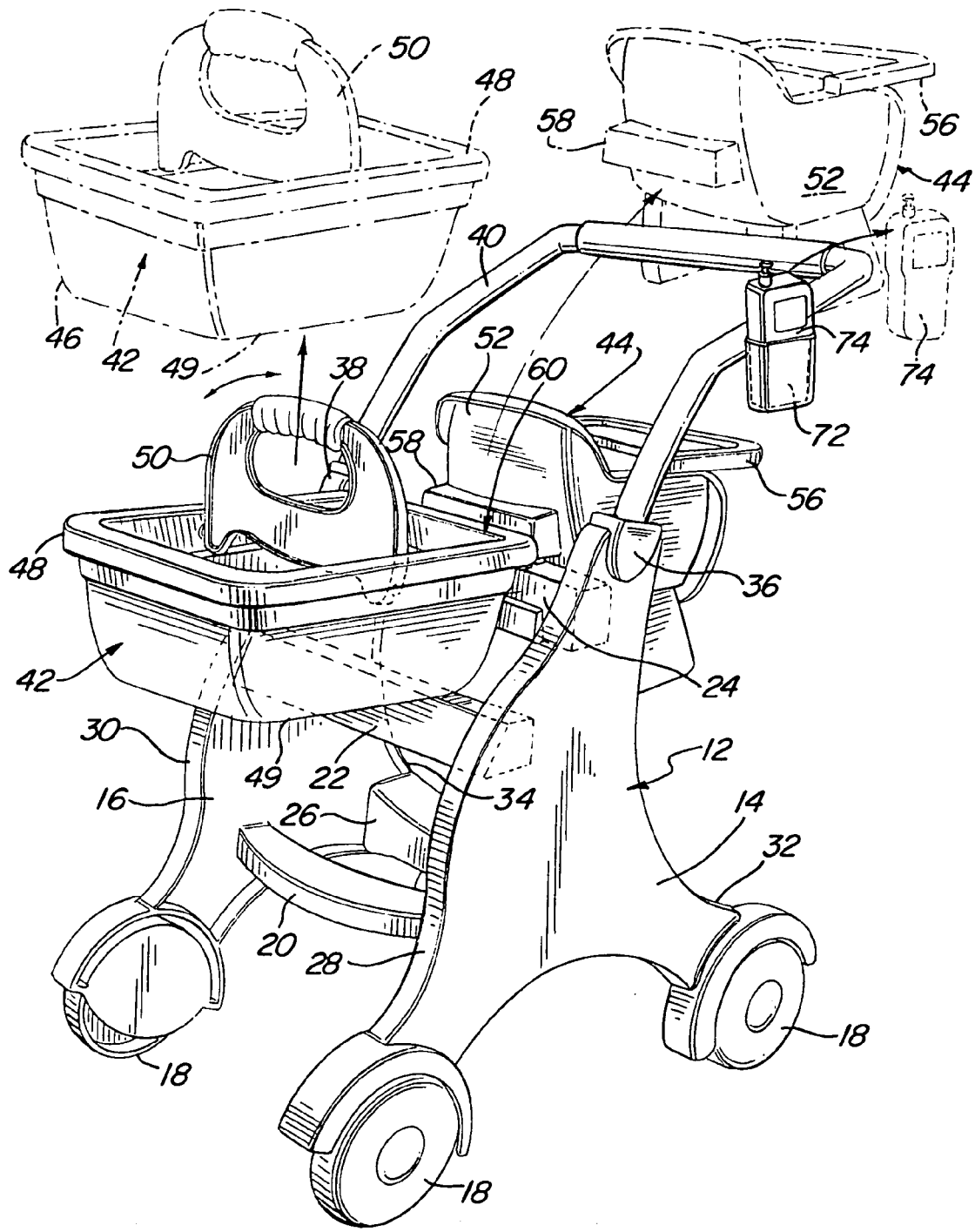
FIG. 1 is a perspective view of a toy shopping cart of the present invention showing a removable basket, seat and telephone in mounted positions in solid line and in removed positions in broken line.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified toy shopping cart generally indicated at 10.

The toy shopping cart 10 has a frame 12 comprised of a pair of leg assemblies 14, 16, forming sides of the shopping cart and having wheels 18, preferably four (4), mounted at lower ends thereof (2 to a side assembly). The leg assemblies 14, 16 are preferably held together in an open configuration by a plurality of cross-beams or cross-members 20, 22, 24, 26 secured at opposite ends to interior surfaces of the leg assemblies. The cross-member 26 may include an axle to connect rear wheels 18.

Each of the leg assemblies 14, 16 includes a first or front face or surface 28, 30 and a second or rear face or surface 32, 34. Top portions 36, 38 of the leg assemblies 14, 16 are bridged or connected together by a handle 40, which handle may be fixed or removable.

A basket 42 and a seat 44 are removably held or hung on the frame 12 between the front faces 28, 30 and rear faces 32, 34. The basket 42 and seat 44 may take any desired form or shape and are removably secured to the frame 12 in any desired manner. In a currently preferred embodiment of the invention, the basket 42 is comprised of an open top body, housing or shell 46 having an upper circumferential lip 48, a base or bottom 49 and a handle 50. The handle 50 is preferably rotatably mounted in the body, housing or shell 46 and movable in the direction of arrow 51. The lip 48 provides added strength around the open top of the body, housing or shell 46 and further allows the basket 42 to be removably hung or secured in or on a channel 60 formed or secured on an upper surface of cross-member 24. A plurality of simulated food and similar items (not shown) may be placed in the basket 42 during play or simulated shopping by a child. To further support the basket 42 in the frame 12, the basket is sized and dimensioned, and the cross-member 22 is positioned or spaced in the frame, so that the base 49 of the basket rests on a top surface of the cross-member 22.

The seat 44 preferably comprises a chair portion 52 with leg portions 54 and a tray 56. A holding portion 58, preferably having a substantially inverted L-shape with an open bottom and closed ends, is formed on or secured to a rear surface of the chair portion 52 to removably hang or hold the seat 44 on the channel 60 formed or secured on an upper surface of cross-member 24. A doll (not shown) may be placed in and supported in the seating portion 52, preferably facing the tray 56.

As best shown in FIGS. 2 and 3, although the channel 60 may be formed in any desired manner to hang or secure the basket 42 and seat 44 to the frame 12, it is preferably comprised of a first or front face or portion 62 and a second or rear face or portion 64. The front face 62 is shown as being longer than the rear face 64 to better receive and hang or support the basket 42 in the frame. The lip 48 and holding portion 58 are respectively, snapped onto or otherwise slid or secured over these front and rear portions 62, 64 to securely hang or hold the basket 42 and seat 44 on the frame 12. Each of the front and rear portions 62, 64 may include a plurality of dividers or strengthening members 66, 68 that cooperate with end walls of the lip 48 and the holding portion 58 and to frictionally engage the same. Furthermore, the rear surface of the chair portion 52 may also include a plurality of dividers or strengthening members 70, within the holding portion 58, which cooperate with a rear surface of the rear face or portion 64 to aid the holding portion 58 in frictionally engaging the rear face or portion. If desired, each of the dividers 66, 68 and 70 may be angled so as to have a wider lower portion, to enable the basket 42 and seat 44 to be more securely engaged when inserted or pushed onto the channel 60, but to be easily removed from the channel when sufficient upward force is exerted by a child playing with the shopping cart 10.

Although shown as being substantially straight, it is to be understood that either or both of the front or rear portions 62, 64 of the channel 60 may have a slight bend or curvature to conform with any bend or curvature of the lip 48 and/or the holding portion 58.

For added play value, the handle 40 may include a holster 72 fixed to or removably secured on the handle 40 for removably holding a simulated telephone 74, such as a cellular phone.

When the basket 42, the seat 44 and the telephone 74 are removed from the shopping cart 10, they may be used by a child in any desired manner. For example, the basket 42 may be used to collect or shop for items, while the seat 44 may be set down on a flat surface and supported by leg portions 54. A doll (not shown) may be placed in the chair portion 52 seated in front of the tray 56. Food items may then be placed on the tray 56 and a child may feed the doll. The tray 56 may be mounted so as to be movable in and out and capable of being flipped over. The flip side of the tray may be provided with a colorful placemat and napkin graphic, as well as recessed areas with feeding implements, such as attached utensils, a bowl, a cup, or the like.

The toy cart 10 may be made in any desired manner in any desired size, from any desired material, but is preferably made from one or more plastics to be hygienic and cleanable, and usable by a child while playing with dolls and simulated food and other items. For example, the frame 12, basket 42 and seat 44 may be molded or otherwise formed in one or more pieces having any desired color or finish.

There has thus been described a novel and unique toy shopping cart that contains easily removable elements to enhance its play value to a child, with or without a doll.

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than as specifically described herein.

What is claimed is:

1. A toy shopping cart, comprising:
   a frame comprised of a pair of leg assemblies secured together by a plurality of cross-members;
   the pair of leg assemblies having wheels at lower ends thereof and a handle connected between upper ends;
   a basket comprising a housing with a handle and a rim along an outer periphery on a top edge of the housing removably held in a first portion of the frame;
   a seat removably held in a second portion of the frame; and
   a channel having a front portion and a rear portion on one of the plurality of cross-members for supporting the rim by the front portion and the seat in the frame.

2. The toy shopping cart of claim 1 wherein a second of the plurality of cross-members supports a base of the basket in the frame.

3. The toy shopping cart of claim 2 wherein the seat has a chair portion and a tray, and a holding portion on a rear surface of the chair portion.

4. The toy shopping cart of claim 3 wherein the holding portion cooperates with the rear portion to hold the seat on the frame.

5. A toy shopping cart, comprising:
   a frame comprised of a pair of leg assemblies secured together by a pluarity of cross-members;
   the pair of leg assemblies having wheels at lower ends thereof and a handle connected between upper ends;
   a basket removably held in a first portion of the frame;
   a seat removably held in a second portion of the frame;
   a channel on one of the plurality of cross-members for supporting the basket and seat in the frame; and
   the channel being formed from a front portion and a rear portion, which front portion and rear portion cooperate with the basket and the seat to removably hold the basket and seat on the frame.

6. The toy shopping cart of claim 5 wherein the seat has a chair portion and a tray, and an open holding portion on a rear surface of the chair portion, and the open holding portion cooperates with the rear portion to secure the seat on the frame.

7. The toy shopping cart of claim 6 wherein the basket has a housing with an open top, a rotatable handle and a base; and the housing is sized and dimensioned to fit into the frame and have its base supported on a second of the plurality of cross-members.

8. The toy shopping cart of claim 7 wherein the housing has a rim formed along an outer periphery on a top edge of the housing.

9. The toy shopping cart of claim 8 wherein the rim hangs on the front portion to support the basket on the frame.

10. A toy shopping cart, comprising:
    a frame comprised of a pair of leg assemblies secured together by a plurality of cross-members;
    the pair of leg assemblies having wheels at lower ends thereof and a handle connected between upper ends;
    a basket removably held in a first portion of the frame;
    a seat removably held in a second portion of the frame;
    a channel on one of the plurality of cross-members for supporting the basket and seat in the frame; and
    the seat having a chair portion, a tray, and an open holding portion secured on a rear surface of the chair portion.

11. The toy shopping cart of claim 10 wherein the channel includes a front portion and a rear portion, and wherein the open holding portion is slipped onto the rear portion to hold the seat on the frame.

12. The toy shopping cart of claim 11 wherein the basket has a housing with an open top, a rotatable handle, a base and a rim formed along an outer periphery of the open top, whereby the rim may be hung on the front portion to support the basket on the frame.

13. A toy shopping cart, comprising:
   an open frame comprised of a pair of leg assemblies have a first portion and a second portion secured together by a plurality of cross-members;
   the pair of leg assemblies having wheels at lower ends thereof and a handle connected between upper ends;
   a basket having a housing with an open top, a rim along an outer periphery of the open top, a rotatable handle and a base, removably held in the first portion of the frame;
   a seat having a chair portion, a tray, and an open holding portion secured on a rear surface of the chair portion removably held in a the second portion of the frame; and
   a channel secured on one of the plurality of cross-members for supporting the basket and the seat in the frame.

14. The toy shopping cart of claim 13 wherein the channel includes a front portion and a rear portion, and wherein the rim hangs on the front portion to support the basket on the frame and the open holding portion hangs on the rear portion to hold the seat on the frame.

15. The toy shopping cart of claim 14 wherein the housing is sized and dimensioned to fit into the frame and have its base supported on a second of the plurality of cross-member.

16. A toy shopping cart, comprising:
   an open frame comprised of a pair of leg assemblies have a first portion and a second portion; the pair of leg assemblies being secured together by a plurality of cross-members and having wheels at lower ends and a handle connected between upper ends;
   a basket held in the first portion of the frame; the basket having a housing with an open top, a rim formed along an outer periphery of the open top, a rotatable handle held in the open top and a base;
   a seat held in the second portion of the frame; the seat having a chair portion, a tray, and an open holding portion secured on a rear surface of the chair portion; and
   a channel secured on one of the plurality of cross-members; the channel including a front portion and a rear portion, and wherein the rim hangs on the front portion to removably support the basket on the frame and the open holding portion hangs on the rear portion to removably hold the seat on the frame.

17. The toy shopping cart of claim 16 wherein the housing is sized and dimensioned to fit into the frame and have its base supported on a second of the plurality of cross-member.

* * * * *